US012572922B2

(12) United States Patent
    Lovas et al.

(10) Patent No.: US 12,572,922 B2
(45) Date of Patent: Mar. 10, 2026

(54) CROSS-CHAIN TRANSACTION SIGNING

(71) Applicant: Ava Labs, Inc., New York, NY (US)

(72) Inventors: Gergely Lovas, Kecskemét (HU);
    MacMillan Charnley Morse, Salt Lake
    City, UT (US)

(73) Assignee: Ava Labs, Inc., New York, NY (US)

( * ) Notice: Subject to any disclaimer, the term of this
    patent is extended or adjusted under 35
    U.S.C. 154(b) by 0 days.

(21) Appl. No.: 18/946,017

(22) Filed: Nov. 13, 2024

(65) Prior Publication Data

US 2025/0190976 A1    Jun. 12, 2025

Related U.S. Application Data

(60) Provisional application No. 63/608,101, filed on Dec.
    8, 2023.

(51) Int. Cl.
    G06Q 20/36 (2012.01)
    G06Q 20/38 (2012.01)

(52) U.S. Cl.
    CPC ......... G06Q 20/367 (2013.01); G06Q 20/389
    (2013.01)

(58) Field of Classification Search
    CPC ........................... G06Q 20/367; G06Q 20/389
    USPC ............................................................. 705/65
    See application file for complete search history.

(56) References Cited

U.S. PATENT DOCUMENTS

2019/0172026 A1    6/2019  Vessenes et al.
2020/0278958 A1*   9/2020  Zhang ................ G06Q 20/3678

2021/0042744 A1*   2/2021  Zheng ................. G06Q 20/401
2021/0150065 A1    5/2021  Qiu
2021/0272111 A1    9/2021  Wu et al.
2023/0222491 A1*   7/2023  Pacella .................. G06Q 20/06
                                                              705/69
2023/0259930 A1*   8/2023  Liu ...................... G06Q 20/389
                                                              705/75

(Continued)

FOREIGN PATENT DOCUMENTS

CN        113469809 A  * 10/2021  ........... G06Q 20/367
NL           2029244 B1    8/2022

OTHER PUBLICATIONS

International Search Report and Written Opinion for International
Patent Application No. PCT/US2024/055791, mailed Jan. 17, 2025
(7 pages).

(Continued)

*Primary Examiner* — Courtney P Jones
(74) *Attorney, Agent, or Firm* — McDermott Will &
Schulte LLP

(57)        ABSTRACT

A method and system for cross-chain signing in blockchain
wallets are provided. Various aspects may include receiving
a transaction request, initiated by a user using a wallet
connected to a first network, at a decentralized application
operating on a second network. Aspects may also include
appending, to the transaction request, an identification
parameter associated with the second network. Aspects may
also include generating a transaction based on the transac-
tion request and the identification parameter. Aspects may
also include signing the transaction in the wallet on the
second network using a private key associated with an
account of the user. Aspects may also include submitting the
signed transaction to the second network.

20 Claims, 8 Drawing Sheets

(56) References Cited

U.S. PATENT DOCUMENTS

| | | | | | |
|---|---|---|---|---|---|
| 2023/0334470 | A1* | 10/2023 | Beller | ........................ | H04L 9/50 |
| 2024/0037519 | A1* | 2/2024 | Sardesai | ................ | G06Q 20/36 |
| 2024/0205019 | A1* | 6/2024 | Chan | .................... | G06Q 20/223 |
| 2024/0289756 | A1* | 8/2024 | Bimolaksono | ..... | G06Q 20/3825 |
| 2025/0014099 | A1* | 1/2025 | Dincoglu | .............. | G06Q 40/04 |

OTHER PUBLICATIONS

Vogelsteller, F., et al., "EIP-1193: Ethereum Provider JavaScript API," Ethereum Improvement Proposals, No. 1193, Jun. 2018, 15 pages [Online Serial] Available at <https://eips.ethereum.org/EIPS/eip-1193>.

* cited by examiner

100

PARTICIPANTS 110

PARTICIPANTS 130

150
NETWORK

152
DATABASE

300

Blockchain Wallet 320

306
Initialize Provider with Chain X

312
Parse Transaction Request

314
Display approval screen with Chain Y

316
User Approves/Rejects the Transaction Request dApp 310

302
Start

304
Provider

308
Send Transaction Request with chainID = Chain Y

318
Result Returned

322
End

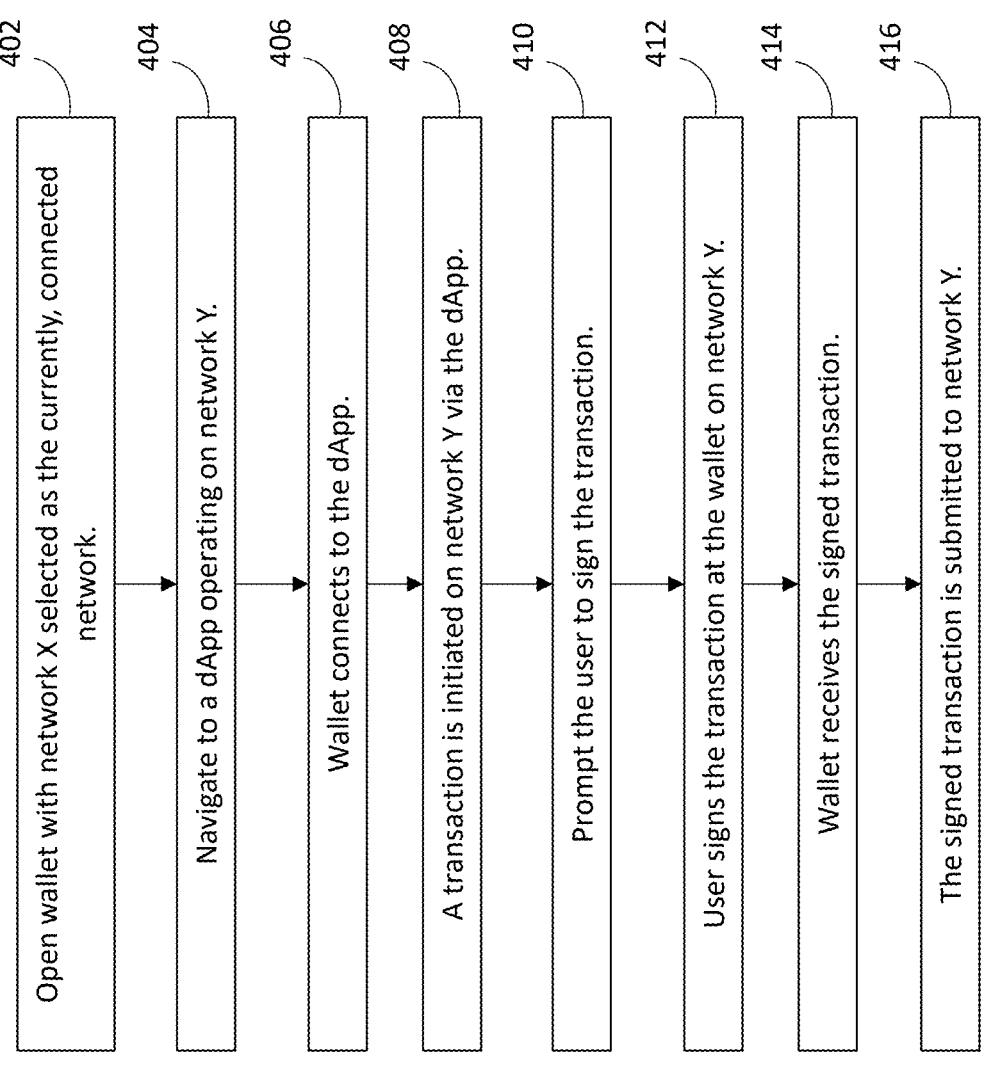

402 Open wallet with network X selected as the currently, connected network.

404 Navigate to a dApp operating on network Y.

406 Wallet connects to the dApp.

408 A transaction is initiated on network Y via the dApp.

410 Prompt the user to sign the transaction.

412 User signs the transaction at the wallet on network Y.

414 Wallet receives the signed transaction.

416 The signed transaction is submitted to network Y.

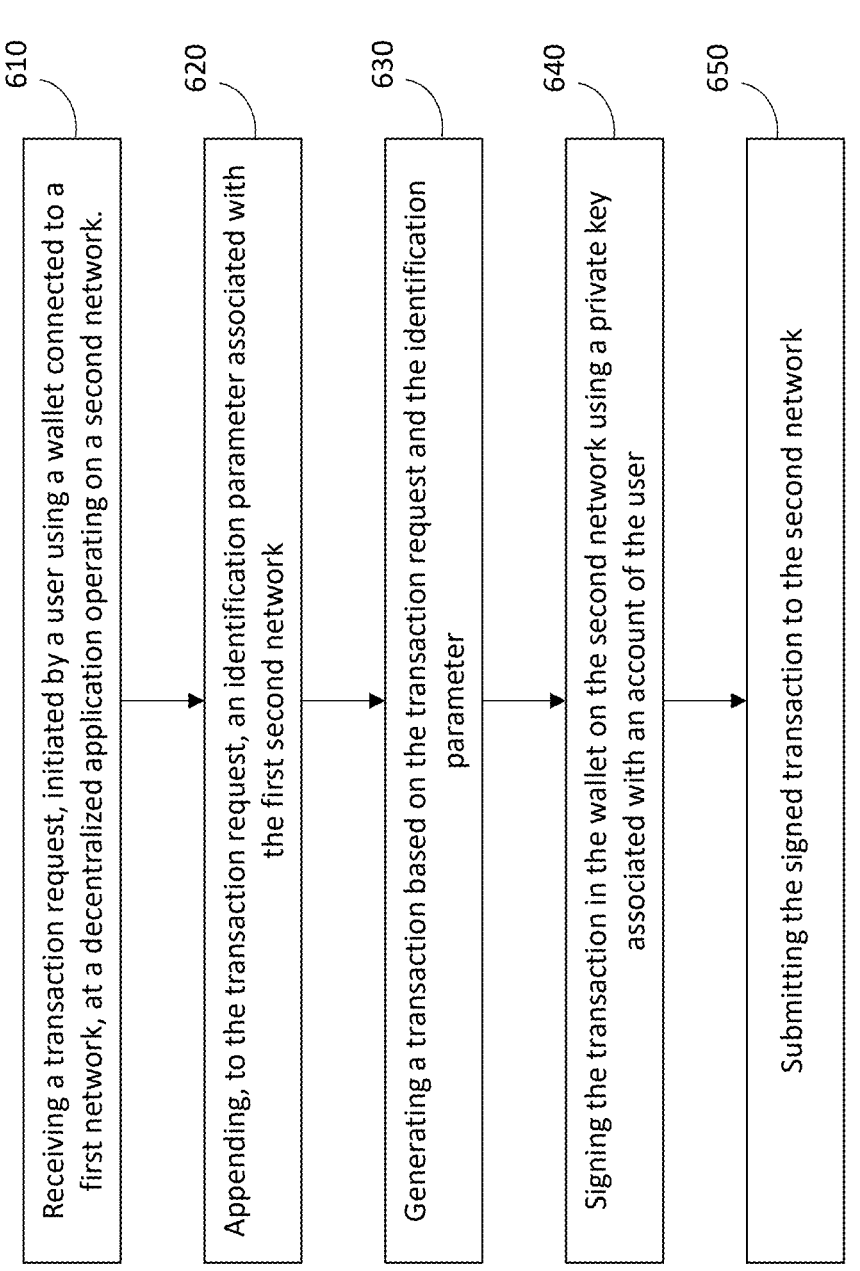

600

610 — Receiving a transaction request, initiated by a user using a wallet connected to a first network, at a decentralized application operating on a second network.

620 — Appending, to the transaction request, an identification parameter associated with the first second network 630 — Generating a transaction based on the transaction request and the identification parameter 640 — Signing the transaction in the wallet on the second network using a private key associated with an account of the user 650 — Submitting the signed transaction to the second network

CROSS-CHAIN TRANSACTION SIGNING

CROSS-REFERENCE TO RELATED APPLICATIONS

The present disclosure is related and claims priority, under 35 U.S.C. § 119(e), to U.S. Provisional Patent Application No. 63/608,101, entitled CROSS-CHAIN TRANSACTION SIGNING to Gergely Lovas, et-al., filed on Dec. 8, 2023, the contents of which are hereby incorporated by reference in its entirety, for all purposes.

TECHNICAL FIELD

The present disclosure generally relates to a blockchain wallet that provides cross-chain transaction signing, enabling users to easily transact across multiple networks used by the wallet without having to manually switch between or across multiple networks. Accordingly, for example, users can issue transactions to a destination chain on a network without switching from a current network or chain (different from the destination chain).

BACKGROUND

A blockchain is a database that maintains records for transactions and tracking of assets in blocks associated with users distributed across a blockchain network. A blockchain wallet allows the distributed users in the blockchain network to store, send, receive, and manage their digital assets on the blockchain. Blockchain wallets generally use a single chain model which maintains an active network to facilitate transactions in the wallets. As such, there is a need for improving user experience when operating in a multi-chain or cross-chain wallet.

SUMMARY

The subject disclosure provides for systems and methods for cross-chain transaction signing in blockchain networks, enabling users to submit transactions on a network different from a connected network in a wallet without switching to the connected network. According to embodiments, a computer-implemented method for signing transaction via a wallet is provided. The method includes receiving a transaction request, initiated by a user using a wallet connected to a first network, at a decentralized application operating on a second network. The method also includes appending, to the transaction request, an identification parameter associated with the second network. The method also includes generating a transaction based on the transaction request and the identification parameter. The method also includes signing the transaction in the wallet on the second network using a private key associated with an account of the user. The method also includes submitting the signed transaction to the second network.

Another aspect of the present disclosure relates to a system including a processor and a memory comprising instructions stored thereon, which when executed by the processor, cause the system to perform operations. The operations include receiving a transaction request, initiated by a user using a wallet connected to a first network, at a decentralized application operating on a second network. The operations also include appending, to the transaction request, an identification parameter associated with the second network. The operations also include generating a transaction based on the transaction request and the identification parameter. The operations also include signing the transaction in the wallet on the second network using a private key associated with an account of the user. The operations also include submitting the signed transaction to the second network.

According to embodiments, a non-transitory computer-readable medium storing a program is provided including instructions (e.g., stored sequences of instructions) that, when executed by a computer, configures the computer to perform a method. The method includes receiving a transaction request, initiated by a user using a wallet connected to a first network, at a decentralized application operating on a second network. The method also includes appending, to the transaction request, an identification parameter associated with the second network. The method also includes generating a transaction based on the transaction request and the identification parameter. The method also includes displaying a transaction approval window on a user interface of the wallet, wherein the transaction approval window includes a visual marker indicating that the first network is different from the second network. The method also includes signing, in response to a user selection on the transaction approval window, the transaction in the wallet on the second network. The method also includes submitting the signed transaction to the second network.

It is understood that other configurations of the subject technology will become apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To easily identify the discussion of any particular element or act, the most significant digit or digits in a reference number refer to the figure number in which that element is first introduced.

FIG. 4 illustrates a workflow of a process for signing a transaction in a wallet using the cross-chain transaction signing mechanism, according to one or more embodiments.

FIG. 6 illustrates an example flow diagram of a method for cross-chain signing in blockchain wallets, according to one or more embodiments.

Figure 1:
FIG. 1 illustrates a network architecture used to implement a blockchain wallet framework for management of a blockchain and digital assets, according to some embodiments.

In the figures, elements having the same or similar reference numerals are associated with the same or similar attributes, unless explicitly stated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, details may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Traditional blockchain wallets use a single chain model maintaining a notion of a current network to facilitate transactions in the wallets. Wallets are perpetually connected to a single network that is implicitly referred to by all connected decentralized application (dApps) and APIs. Users can only transact on a given chain that is currently set and used by the wallet. Therefore, to interact with multiple blockchain networks, users must switch between the networks, changing the notion of the current network. When a dApp intends to issue a transaction on a different chain, it has to initiate a network switch and change the current network. Changing the notion of current network due to a request of one of the connected dApps also changes the notion for all APIs and dApps connected to the wallet. Therefore, if dApps A switches to network Y, dApps B which is currently connected to the wallet on network X must also switch to network Y (even if dApps B always operates on network X). This process creates a disjointed user experience, particularly when applications and websites attempt to utilize multiple networks simultaneously to issue transactions.

For example, if a wallet user with network A selected in the wallet wants to send a transaction on a chain on network B, the user may be prompted to switch from network A to network B. The user must set the wallet to a given chain on network B to be used by the wallet for the transaction. Once the network is switched, the user can initiate and sign the transaction on network B. The transaction can then be submitted to network B. As such, the user is prompted twice to facilitate a transaction when the wallet is not connected to the desired network, first to request a network switch and again to request to issue/sign the transaction on the desired network. Similarly, if the user wants to issue transactions back on network A, another network switch is required to set the current network back to the network of network A. This back and forth based on the transactions has many undesired effects including, for example, hindering user experience and usability of the wallet. A wallet connected to multiple dApps simultaneously would switch networks for all the dApps at once, including dApps that do not support the desired network which introduces unnecessary processing. Further, having multiple approval screens also introduces friction points in the wallet user experience.

As a result of this, it may be advantageous and a technological improvement for blockchain wallets to include cross-chain transaction signing mechanisms. According to embodiments, cross-chain transaction signing mechanisms allow dApps to issue a transaction on a different or parallel chain without changing the notion of current network selected in the wallet. A wallet is an end user application that manages private keys, performs signing operations, and acts as a middleware between a provider interface and a client (e.g., dApp). The dApps may communicate with the wallets through the provider interface. The dApps may contain a chain identification property which reflects which network the wallet is connected to (i.e., a current network), which is maintained by the wallet internally. Embodiments of the present disclosure introduce a parameter (e.g., chainID) indicating which chain each transaction request submitted by the application will be executed on.

According to embodiments, the dApps can attach a chainID to the transactions they are sending. The chainID is used to determine which network (hereafter referred to as the "target network") a given transaction is going to be sent on. According to embodiments, the user is able to sign a transaction in the wallet where the chainID of the transaction specifies a network/chain that is not the same as the currently selected network in the wallet.

According to embodiments, the dApps may use Remote Procedure Call (RPC) requests to perform various operations between the wallet and the blockchain networks (e.g., querying balance information, sending and receiving transactions, and monitoring transaction status, interacting with smart contracts, etc.). In some implementations, the chainID is included in the RPC for each transaction as an additional parameter. In some implementations, the chainID may be appended to the transaction request only when the target network is different from the current network.

According to embodiments, users can sign a transaction via the wallet on a network that is different from the current network. By non-limiting example, a user may sign a token on a target blockchain network or subnet when another network is currently selected in the wallet. This allows users to make swaps across chains (and/or subnets) without having to switch networks within the wallet.

According to embodiments, the user may be prompted with a single transaction approval window for an interaction (i.e., from transaction initiation by the user to transaction submission by the wallet to the target network) on the wallet. The single transaction approval window may include, but is not limited to, a pop-up on a display screen of the user indicating a name of a target chain and/or target network.

The single transaction approval window may serve as confirmation for the user clearly indicating that the user is signing a transaction on a different chain from the current chain. Accordingly, executing the transaction does not require prompting the user to switch chains or switching to a target network corresponding to the chain the user wants to send the transaction on in order to issue the transaction.

The disclosed system addresses a problem in blockchain technology tied to computer technology, namely, the technical problems in cross-chain wallet transactions. By enabling cross-chain transaction signing, users can transact easily across multiple networks without having to manually switch between or across multiple networks. Accordingly, the cross-chain transaction signing mechanism improves the functionality and usability of a blockchain wallet.

Embodiments also enable new technical and product decisions that lead to improved performance and user experience. By non-limiting example, decentralized exchanges may utilize the cross-chain transaction signing feature to make the user experience more seamless and pleasant, providing users the ability to use a first chain to custody assets, use their own blockchain or subnet to make swaps and transactions, and reduce friction points in the overall user experience. The ability to avoid frequent network switching accelerates swaps/transactions and reduced cost.

As used herein, the term "blockchain" as used herein refers, according to some embodiments, to a database that maintains records for transactions and tracking of assets in blocks associated with users distributed across a blockchain network. Each blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example.

Blockchain networks may utilize a consensus protocol as a building block for building distributed systems. As an example, blockchain networks can include multiple blockchains (equivalently referred to as subnets), that can be used for different types of applications, including but not limited to a component exchange blockchain for creating and trading digital smart assets, a metadata blockchain for coordinating validators as well as tracking and creating subnets, and a contract blockchain for creating smart contracts on the blockchain network.

As used herein, the term "block" generally refers to a record that is kept in a blockchain. For example, each block contains a cryptographic hash of the previous block, a timestamp, and transaction data. The state of each block and/or the transaction data may be represented as a Merkle tree root hash.

The term "subnet" as used herein refers, according to some embodiments, to independent blockchain networks that run on top of the parent blockchain network and allow developers and organizations to create custom blockchains with their own rules, consensus mechanisms, and token economics. A subnet includes a dynamic set of nodes (e.g., one or more validators) seeking to achieve consensus on a state of a set of blockchains such that one blockchain is validated by one subnet, although one subnet can validate multiple blockchains. A node can participate in the validation of multiple subnets and can be subject to requirements of the blockchains within those subnets, such as for security, licensing, hardware and/or the like. Subnets may be equivalently referred to herein as "subnetworks."

Example Architecture

FIG. 1 illustrates a network architecture 100 used to implement a blockchain wallet framework for management of a blockchain and digital assets. Specifically, in this example, the network architecture 100 provides a blockchain wallet implementation and deployment framework, according to some embodiments.

In the example of FIG. 1, the network architecture 100 includes one or more participants 110 and one or more participants 130 which are communicatively coupled through a network 150. The network 150 may include a wired network (e.g., via fiber optic or copper wire, telephone lines, and the like) and/or a wireless network (e.g., a satellite network, a cellular network, radiofrequency (RF) network, Wi-Fi, Bluetooth, and the like). The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, and/or the like. The participants 110 may be clients of the blockchain framework for creating, expanding, or otherwise modifying customized blockchain networks and/or private or public subnets.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

The participants 110 and/or the participants 130 may function as nodes for one or more blockchains implemented on the network architecture 100. As an example, the participants 110 and/or the participants 130 may themselves be, or may execute, virtual machines (VMs) that function as nodes of one or more blockchains, and accordingly run software to verify block and transaction data, store data, validate, respond to network requests for data, execute smart contracts, and/or the like for their respective blockchain(s).

As a non-limiting example, multiple participants 110 may have access to at least one blockchain network hosted by the participants 130. As another non-limiting example, the participants 130 may provide services such as Internet based services including web2 services and web3 services, for example, to the participants 110.

The participants 130 may store blockchain data in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus and messaging protocols.

The participants 130 may be configured to concurrently implement multiple blockchains of different types, including but not limited to an asset blockchain (e.g., for creating new assets, asset exchange, cross-subnet transfers), a metadata blockchain (e.g., for coordinating validators, tracking active subnets, and creating new subnets), and a smart contract blockchain (e.g., for creating smart contracts and applications that require total ordering).

Figure 2:
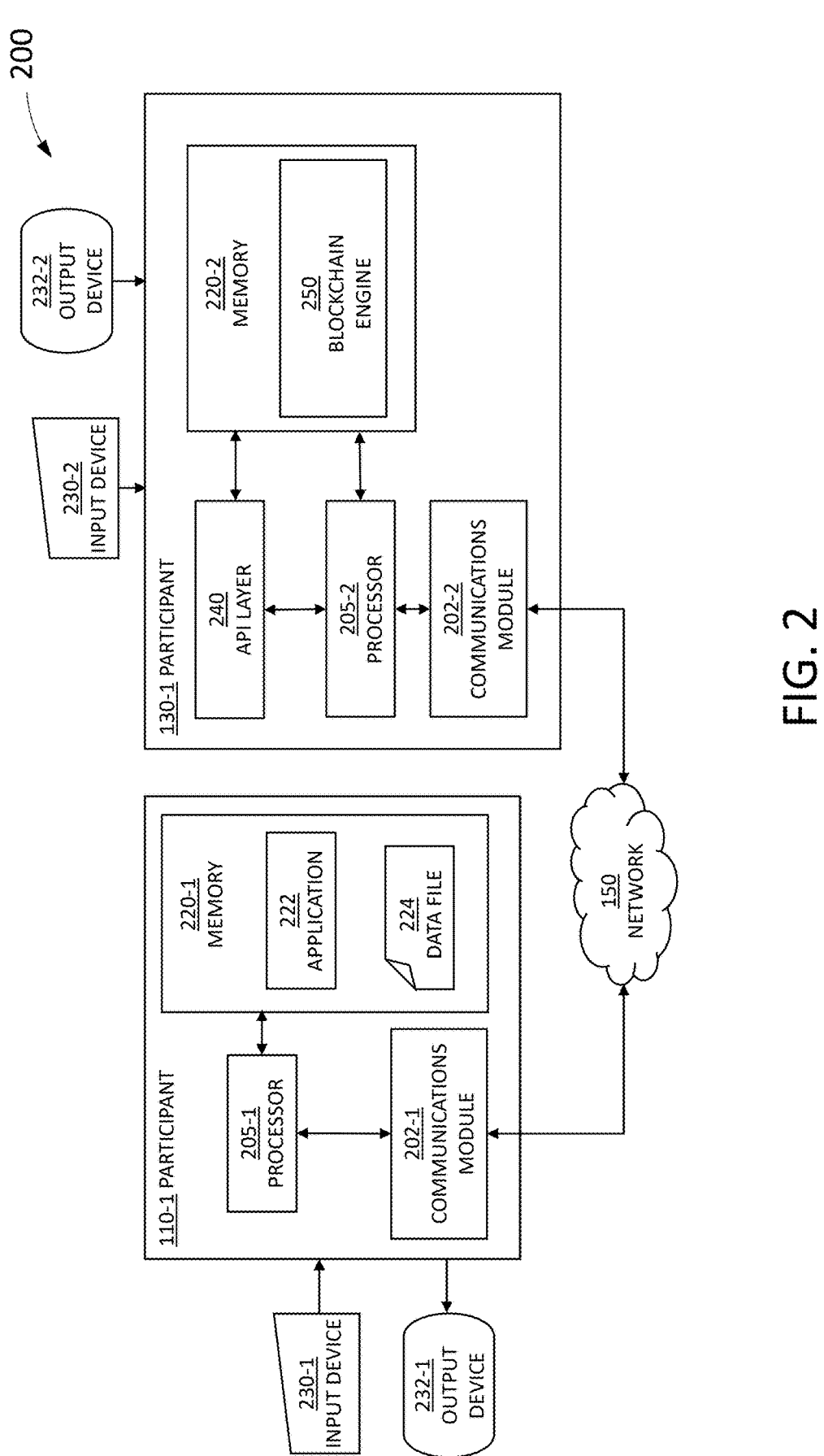
FIG. 2 is a block diagram illustrating participants in FIG. 1 implementing a cross-chain signature mechanism in a blockchain wallet, according to some embodiments.

FIG. 2 is a block diagram illustrating details of participants in FIG. 1 implementing a cross-chain signature mechanism in a blockchain wallet, according to some embodiments. Specifically, the example of FIG. 2 illustrates an exemplary participant 110-1 (of the participants 110) and an exemplary participant 130-1 (of the participants 130) of the network architecture 100 of FIG. 1. The system 200 may implement protocols for blockchain-related consensus or messaging for any subnet or blockchain executing on the network architecture 100. A blockchain implemented on system 200 may include blockchains validated and secured by a primary subnet (e.g., primary network) comprising one or more of the participants 130. For example, in some embodiments, participant 130-1 may be configured to operate as blockchain validators to verify transactions on a blockchain. Participant 110-1 may comprise a blockchain wallet capable of interfacing with multiple blockchain networks through network 150.

The participant 110-1 and the participants 130-1 access each other and other devices in the network 150 via corresponding communications modules 202-1 and 202-2, respectively. The communications modules 202-1 and 202-2 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). The participant 110-1 and participant 130-1 also include a processor 205-1, 205-2 and memory 220-1, 220-2, respectively. Communications modules 202-1 and 202-2, processors 205-1 and 205-2, and memories 220-1 and 220-2 will be collectively referred to, hereinafter, as "communications modules 202," "processors 205," and "memories 220." Processors 205 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touch-screen display, and the like. The participant 110-1 and the participant 130-1 are also coupled to at least one output device 232-1 and output device 232-2, respectively (hereinafter, collectively referred to as "output devices 232"). The output devices 232 may include a display (e.g., a same touchscreen display used as an input device), a speaker, an alarm, and the like. A user may interact with participant 110-1 and/or participant 130-1 via the input devices 230 and the output devices 232.

The participant 110-1 can implement and/or manage the blockchain networks described herein by executing application 222 within memory 220-1 and couple with input devices 230 and output devices 232. The application 222 may be downloaded by a user from participant 130-1, and/or may be hosted by participant 130-1. The application 222 includes specific instructions which, when executed by processor 205-1, perform operations consistent with embodiments of the present disclosure.

In some embodiments, the application 222 runs on an operating system (OS) installed on participant 110-1. In some embodiments, application 222 may run within a web browser. In some embodiments, the processor 205-1 is configured to control a graphical user interface (GUI) (spanning at least a portion of input devices 230 and output devices 232) for the user of participant 110-1 to access participant 130-1.

Data and files associated with the application 222 may be stored in a local data file 224 stored in memory 220-1, a local database of participant 110-1 or participant 130-1, or an external database (e.g., database 152, a distributed database, and the like). The participant 110-1 may be used by a user of the blockchain wallet to perform blockchain functions including, but not limited to, message transfer, exchange transactions, blockchain validation, block proposal, and the like.

Participant 130-1 includes an API layer 240, which may control the application 222 in participant 110-1. API layer 240 may also provide instructions, procedural information, updates, or the like to participant 110-1 as, e.g., an RPC request submitted to a consumer providing access to a blockchain network for some procedure to be processed in the application 222.

In some embodiments, memory 220-2 includes a blockchain engine 250. The blockchain engine 250 may be configured to perform methods and operations consistent with embodiments of the present disclosure. The blockchain engine 250 may share or provide features and resources with the client device, including data, libraries, and/or applications retrieved with blockchain engine 250 (e.g., application 222). The user may access the blockchain engine 250 through the application 222. Application 222 may be installed in participant 110-1 by participant 130-1 and perform scripts and other routines provided by participant 130-1.

Figure 3:
FIG. 3 illustrates workflow of a cross-chain transaction signing process for a transaction initiated in a decentralized application connected to a browser-based wallet extension, according to one or more embodiments.

FIG. 3 is a workflow of a cross-chain transaction signing process 300 for a transaction initiated in a dApp connected to a browser-based wallet extension, according to one or more embodiments. The wallet may be connected to multiple dApps, each dApp configured to submit transactions on various blockchain networks. According to embodiments, the cross-chain transaction signing mechanisms enable a transaction request to be submitted onto a network that is different from the network currently selected or connected to the wallet.

At start 302, a transaction is initiated at dApp 310 operating on chain Y. A user may initiate the transaction using the blockchain wallet 320.

The dApp 310 connects to a provider 304 (e.g., an injected provider) which enables access to a blockchain network using a blockchain client implementing a specific blockchain protocol of the blockchain network. The client may be an endpoint that receives requests (e.g., RPC requests) from the provider and returns the results of the request. The provider 304 may be considered connected when it can service requests to at least one chain. The provider 304 may be considered disconnected when it cannot service requests to any chain.

The wallet 320 may be be connected to chain X which operates on a current network. The wallet 320 may initialize an inpage provider with chain X 306 to conform to the provider's standard, promoting wallet interoperability. For a dApp and browser extension wallet to communicate, the browser extension wallet has to inject a piece of code into the website. This creates an interface for the dApp to communicate with the wallet called the inpage provider. The inpage provider has a state normally synced to the wallet's internal state. At 306, the wallet initializes the inpage provider's state for the first time based on the wallet's current state. In this manner, when users open the wallet's UI, the UI will show chain X is connected, and the dApp will also be connected to chain X through the inpage provider. In some implementations, the provider is injected into the dApp and then initialized at the wallet. In some implementations, the inpage provider is initialized when the user attempts to interact with the dApp 310.

The transaction request 308 may be an RPC request (e.g., 'blockchain Network_sendTransaction') sent from the dApp 310 to the blockchain wallet 320. The RPC request enables the dApp 310 to interact with the blockchain (e.g., send a transaction). Transaction requests may include a set of standard parameters including, but not limited to, source (i.e., where the transaction is coming from represented as, e.g., 'from: string'), target (i.e., where the transaction will be submitted which may be represented as, e.g., 'to?: string'), value, data, gas, gas price, maxFeePerGas, maxPriorityFee-PerGas, or the like.

The transaction request may include a chainID parameter indicating chain Y as the desired network for the transaction to be executed on. The chainID may be identified by the wallet 320 and used to facilitate the cross-chain transaction signing at the wallet 320.

For example, parameters of 'blockchainNetworkSend-Transaction' request may include: 'chainId?: string'; 'from: string'; 'to?: string; value?'; 'string; data?: string'; 'gas?: number'; 'gasPrice?: string'; 'maxFeePerGas?: string'; and 'maxPriorityFeePerGas?: string'.

The wallet 320 parses the transaction request 312. In some embodiments, parsing the transaction request 312 may include extracting one or more parameters of the transaction request and, based on the parameters, identifying at least the desired chain (e.g., chain Y). According to embodiments, when the dApp wants to issue a transaction, it interacts with the initialized inpage provider. The wallet 320 may parses the transaction and check whether the 'chainID=' parameter is present. If it is present, the wallet 320 may validate the correctness of the transaction against the provided chain (e.g., chain Y) and attempts to issue the transaction on the desired network. Otherwise, when the parameter is not present, the wallet 320 may default to its internal state (i.e., currently connected chain, e.g., chain X).

In some embodiments, the wallet 320 may also identify, for example, transaction details, balance information, and network fees based on the one or more parameters.

The wallet 320 then displays an approval window 314, prompting to sign the transaction. In accordance with the transaction request, the approval window may indicate chain Y as the desired chain issuing the transaction. Chain Y may be in a target network different from the current network connected on the wallet 320.

According to embodiments, the approval window may include an indication that the desired network is different from the current network on the wallet 320. In some implementations, to indicate clearly which chain the transaction is executed on, the wallet 320 may display an amber warning sign and/or the name of the desired chain in the approval window (examples of which are provided in FIG. 7). The approval window may also include, for example, transaction details, balance information, and network fees identified based on the transaction request.

The user may approve and sign the transaction or reject the transaction request 316. If the transaction request is approved, the transaction is issued on chain Y and the result is returned 318 to the dApp 310. Similarly, if the transaction request is rejected, the transaction is not issued, and the result is returned 318 to the dApp 310. Finally, the workflow

300 for the cross-chain transaction ends 322 without needing to switch the current network from chain X.

FIG. 4 illustrates a workflow of a process 400 for signing a transaction in a wallet using the cross-chain transaction signing mechanism, according to one or more embodiments. The cross-chain transaction signing mechanism gives users the ability to sign a transaction on a chain that is different from the one they currently have selected in the wallet. Enabling cross-signing between networks reduces disruptions in the user experience, streamlining swaps/transactions in the wallet.

At 402, a user may open a wallet with network X selected as the currently, connected network. Opening the wallet will enable the transactions to be signed and issued on one or more networks on the wallet. The connected network tells the wallet which network to issue transactions on. In some implementations, the user currently selects network X. In some implementations, network X was preselected and maintained its connection on the wallet.

At 404, the user may navigate to a dApp operating on network Y. The user may select the dApp to initiate the transaction (e.g., swap a token) on the dApp. According to some embodiments, attempting to issue a transaction via the dApp on a network different from the current network may trigger the cross-chain transaction signing mechanism of the wallet. Given the wallet is connected to network X, and the user is navigating to the dApp operating on network Y, the cross-chain transaction signing process may be activated.

According to some embodiments, with reference to FIG. 3, the navigating to the dApp operating on network Y may trigger the start 302 in the cross-chain transaction signing process 300.

At 406, the wallet connects to the dApp. The wallet must connect to the dApp in order to issue a transaction via the dApp on network Y. The wallet serves as the user's gateway to the blockchain, allowing them to securely sign and submit transactions to the dApp. Connecting the wallet will enable the user to provide a unique cryptographic signature for signing transactions. The signature proves the user's identity. The signature may be created using a private key of the account initiating the transaction.

At 408, a transaction is initiated on network Y via the dApp. According to some embodiments, the cross-chain transaction signing mechanism of the wallet is triggered when the transaction is initiated.

At 410, the wallet prompts the user to sign and approve or reject the transaction. In some embodiments, the user may sign the transaction on an approval window displayed at a user interface of the wallet.

At 412, the user signs or approves the transaction in the wallet on network Y while the wallet maintains its current connection to network X. The transaction is signed on network Y without switching the wallet's connected network, network X, to network Y.

At 414, the wallet receives the signed transaction and, at 416, the wallet submits the signed transaction to network Y (via a provider or API). The transaction may then be executed and recorded on the network Y. According to some embodiments, the transaction can only be submitted if an associated user account contains a balance sufficient to support the transaction. By non-limiting example, if the transaction request is for swapping a token from a first chain to a second chain, the corresponding user account must contain a balance at least equal to or greater than an amount of the token and associated transaction fees (e.g., network fees and/or gas).

Accordingly, the cross-chain transaction signing enables users to operate on multiple chains in the wallet simultaneously. From a user's perspective, they can sign and submit transactions on multiple chains without the disruption of switching/alternating between the networks, providing users with the ability to interact with applications on multiple blockchains at the same time. According to some embodiments, a user can transact with one or more different decentralized exchanges (e.g., a transaction between the Avalanche C-Chain and another blockchain or subnet) without having to switch networks in the user's wallet, opening new possibilities for cross-chain activity in wallets. By non-limiting example, a cross chain transaction signing mechanism may settle on a subnet but receive transaction initiation from another network (e.g., C-Chain).

Figure 5:
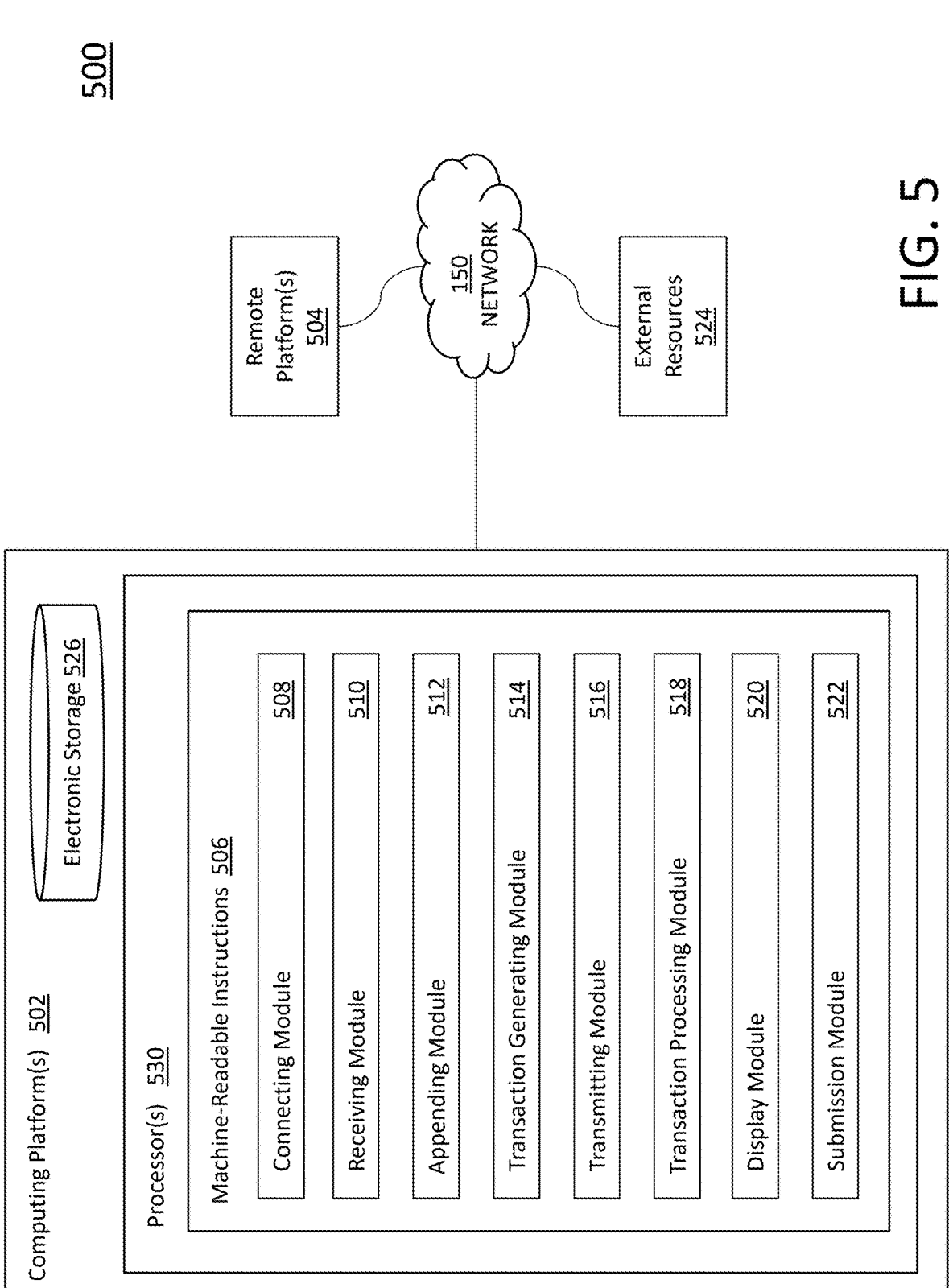
FIG. 5 illustrates an exemplary block diagram of a computer system with which aspects of technology can be implemented, according to one or more embodiments.

FIG. 5 is an exemplary block diagram of a computer system 500 with which aspects of technology can be implemented. In some implementations, the system 500 may include one or more computing platforms 502. The computing platform(s) 502 can correspond to a server component of a blockchain wallet, which can be similar to or the same as the computing device(s) of participant 130 of FIG. 1 and include the client computing device(s) of participant 110 of FIG. 1 and include the processors 205 in FIG. 2. For example, the computing platform(s) 502 may be configured to execute blockchain wallet precompiles/protocols to generate, validate, and issue transactions.

Computing platform(s) 502 can be configured to implement cross-chain transaction signing mechanisms enabling the signing of transactions in a wallet on a different network operating on a desired dApp and not actively connected to the wallet. The computing platform(s) 502 may be configured to communicate with one or more remote platforms 504 and/or external resources 524 according to a client/server architecture, a peer-to-peer architecture, and/or other architectures. The remote platform(s) 504 may be configured to communicate with other remote platforms via computing platform(s) 502 and/or according to a client/server architecture, a peer-to-peer architecture, and/or other architectures. The remote platform(s) 504 can be configured to cause output of the system 500 on client device(s) of the remote platform(s) 504 with enabled access (e.g., based on analysis by the computing platform(s) 502) according to stored data. The computing platform(s) 502, external resources 524, and remote platform(s) 504 may be in communication and/or mutually accessible via the network 150.

The computing platform(s) may be configured by machine-readable instructions 506. Machine-readable instructions 506 may be executed by the computing platform(s) to implement one or more instruction modules. The instruction modules may include computer program modules. As shown in FIG. 5, the instruction modules may include one or more of a connecting module 508, receiving module 510, appending module 512, transaction generating module 514, transmitting module 516, transaction processing module 518, display module 520, submission module 522, and/or other instruction modules.

The connecting module 508 is configured to connect a wallet to a dApp. The connection may be in response to a user selection of the dApp. According to embodiments, the wallet may require credentials (e.g., a private key) enabling secure access to one or more blockchain networks. DApps may be built on and interact with various blockchain networks. Users may interact with the dApps operating on the blockchain networks via the wallet. Connecting the wallet to the dApp allows the dApp to request transaction signatures and for the wallet to issue transactions based therefrom via the dApp.

The receiving module 510 is configured to receive a transaction request at the dApp. According to embodiments, the wallet may be connected to a first blockchain network and the dApp may be operating on a second blockchain network. The wallet may only be configured to accept the transaction request if a connection with the dApp is established by connecting module 508. The transaction request may be an RPC and a provider of the dApp may only be able to service the RPC if the provider is connected.

The appending module 512 is configured to append an identification parameter associated with the first blockchain network to the transaction request. The identification parameter may indicate which chain or blockchain network a given transaction should be sent to and will be used to ensure that the given network is used (not active network in the wallet). In some implementations, the identification parameter is a chainID specifying a chain the transaction should be submitted on.

According to some embodiments, the system 500 includes determining whether the first network is different from the second network. That is, determining if the dApp is operating on a network different from the currently connected network on the wallet. Based on a determination that the networks are different, the appending module 512 may attached the chainID corresponding to the network operating the dApp to the transaction request.

The transaction generation module 514 is configured to generate a transaction based on the transaction request and the identification parameter. In some implementations, the identification parameter is, for example, empty, null, or set to zero, which may indicate that the target network of the transaction request and the current blockchain network of the wallet are the same.

The transmitting module 516 is configured to transmit the transaction to the wallet. The transmitting module 516 may be further configured to return results of a transaction request from the wallet to the dApp.

The transaction processing module 518 is configured to parse the transaction. The transaction processing module 518 may further be configured to determine transaction information based on parsing the transaction. In some embodiments, the transaction information includes at least in part the second network and a target chain on the second network. The transaction information may include, for example, an associated (user) account, contract on the second network, the decentralized application, a transaction type, a balance of one or more tokens associated with the transaction, and a network fee, or the like.

According to embodiments, the transaction processing module 518 may be further configured to sign the transaction in the wallet based on the transaction information. The transaction may be signed on the second network using a private key associated with the account of the user.

The display module 520 is configured to display a transaction approval window on a user interface of the wallet. The transaction approval may include a visual marker indicating that the first network is different from the second network. In some embodiments, the display module 520 may prompt, at the wallet connected to the first network, the user to approve or sign the transaction on the second network. The system 500 may include (e.g., at receiving module 510) receiving a user selection for an approval or rejection of the transaction.

The submission module 522 is configured to submit the signed transaction to the second network. The signed transaction may be added to the target chain identified (at transaction processing module 518) upon validation of the transaction at the second blockchain network via the second network's provider (e.g., provider 304 or API). Accordingly, the transaction is signed and run on a network different from the connected network at the wallet.

In some implementations, the computing platform(s) 502, the remote platform(s) 504, and/or the external resources 524 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 502, the remote platform(s) 504, and/or the external resources 524 may be operatively linked via some other communication media.

A given remote platform 504 may include client computing devices, which may each include one or more processors configured to execute computer program modules. The computer program modules may be configured to enable an expert or user associated with the given remote platform 504 to interface with the system 500 and/or external resources 524, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms. The external resources 524 may include sources of information outside of the system 500, external entities participating with the system 500, and/or other resources. For example, the external resources 524 may include externally designed blockchain elements and/or applications designed by third parties. In some implementations, some or all of the functionality attributed herein to the external resources 524 may be provided by resources included in system 500.

Computing platform(s) 502 may include the electronic storage 526, processor(s) 530 such as the processors 205, and/or other components. The computing platform(s) 502 may include communication lines, or ports to enable the exchange of information with a network and/or other computing platforms. Illustration of the computing platform(s) 502 in FIG. 5 is not intended to be limiting. The computing platform(s) 502 may include a plurality of hardware, software, and/or firmware components operating together to provide the functionality attributed herein to the computing platform(s) 502. For example, the computing platform(s) 502 may be implemented by a cloud of computing platforms operating together as the computing platform(s) 502.

Electronic storage 526 may include non-transitory storage media that electronically stores information. The electronic storage media of the electronic storage 526 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 526 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 526 may include one or more virtual storage resources (e.g., cloud storage, a virtual private network, and/or other virtual storage resources). Electronic storage 526 may store software algorithms, information determined by the processors 530, information received from computing platform(s) 502, information received from the remote platform(s) 504, and/or other information that enables the computing platform(s) 502 to function as described herein.

Processor(s) 530 may be configured to provide information processing capabilities in computing platform(s) 502. As such, processor(s) 530 may include one or more of a digital processor, an analog processor, a digital circuit designed to process information, an analog circuit designed to process information, a state machine, and/or other mechanisms for electronically processing information. Although processor(s) 530 is shown in FIG. 5 as a single entity, this is for illustrative purposes only. In some implementations, processor(s) 530 may include a plurality of processing units. These processing units may be physically located within the same device, or processor(s) 530 may represent processing functionality of a plurality of devices operating in coordination. Processor(s) 530 may be configured to execute modules 508, 510, 512, 514, 516, 518, 520, and/or 522, and/or other modules. Processor(s) 530 may be configured to execute modules 508, 510, 512, 514, 516, 518, 520, and/or 522, and/or other modules by software; hardware; firmware; some combination of software, hardware, and/or firmware; and/or other mechanisms for configuring processing capabilities on processor(s) 530. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, and/or 522 are illustrated in FIG. 5 as being implemented within a single processing unit, in implementations in which processor(s) 530 includes multiple processing units, one or more of modules 508, 510, 512, 514, 516, 518, 520, and/or 522 may be implemented remotely from the other modules. The description of the functionality provided by the different modules 508, 510, 512, 514, 516, 518, 520, and/or 522 described below is for illustrative purposes, and is not intended to be limiting, as any of modules 508, 510, 512, 514, 516, 518, 520, and/or 522 may provide more or less functionality than is described. For example, one or more of modules 508, 510, 512, 514, 516, 518, 520, and/or 522 may be eliminated, and some or all of its functionality may be provided by other ones of modules 508, 510, 512, 514, 516, 518, 520, and/or 522. As another example, processor(s) 530 may be configured to execute one or more additional modules that may perform some or all of the functionality attributed below to one of modules 508, 510, 512, 514, 516, 518, 520, and/or 522.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 6 illustrates an example flow diagram of a method 600 for cross-chain signing in a wallet, according to some embodiments. The method 600 may be performed by one or more processors or computing modules of a wallet and/or connected dApp. Further for explanatory purposes, the operations of the example method 600 are described herein as occurring in serial, or linearly. However, in some implementations, the method 600 may include additional blocks, fewer blocks, different blocks, or differently arranged blocks than those depicted in FIG. 6. Additionally, or alternatively, two or more of the blocks of the method may be performed in parallel.

As shown in FIG. 6, in operation 610, the method 600 includes receiving a transaction request, initiated by a user using a wallet connected to a first network, at a decentralized application operating on a second network. One or more decentralized applications may be connected to and accessible to users through the wallet. The first network is the active blockchain network in the wallet. The second network may be a blockchain network (different from the first network) where the transaction based on the transaction request will be sent on.

In operation 620, the method 600 includes appending, to the transaction request, an identification parameter associated with the first second network. The identification parameter may include a chainID of the second network. The chainID may be used to identify and submit the transaction on a network different from the active network at the wallet (i.e., first network).

In operation 630, the method 600 includes generating a transaction based on the transaction request and the identification parameter. The transaction may be sent to the wallet where it is parsed, and an approval window is generated for display on a user interface of the wallet. The transaction approval window may include a visual marker indicating that the first network is different from the second network. The user may be promoted to approve or reject the transaction on the second network.

In operation 640, the method 600 includes signing the transaction in the wallet on the second network using a private key associated with an account of the user. According to some embodiments, the transaction is signed based on a user selection approving or rejecting the transaction.

In operation 650, the method 600 includes submitting the signed transaction to the second network via the second network's provider.

The techniques described herein (for example, method 600) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 6 may be performed by a processor circuit executing instructions stored in a memory circuit, in a client device, a remote server or a database, communicatively coupled through a network (e.g., processors 205, processors 530, memories 220, participants 110/130, database 152, and network 150). In some embodiments, one or more of the operations in method 600 may be performed by, e.g., block-chain engine 250. In some embodiments, methods consistent with the present disclosure may include at least one or more operations as in method 600 performed in a different order, simultaneously, quasi-simultaneously or overlapping in time.

Figure 7:
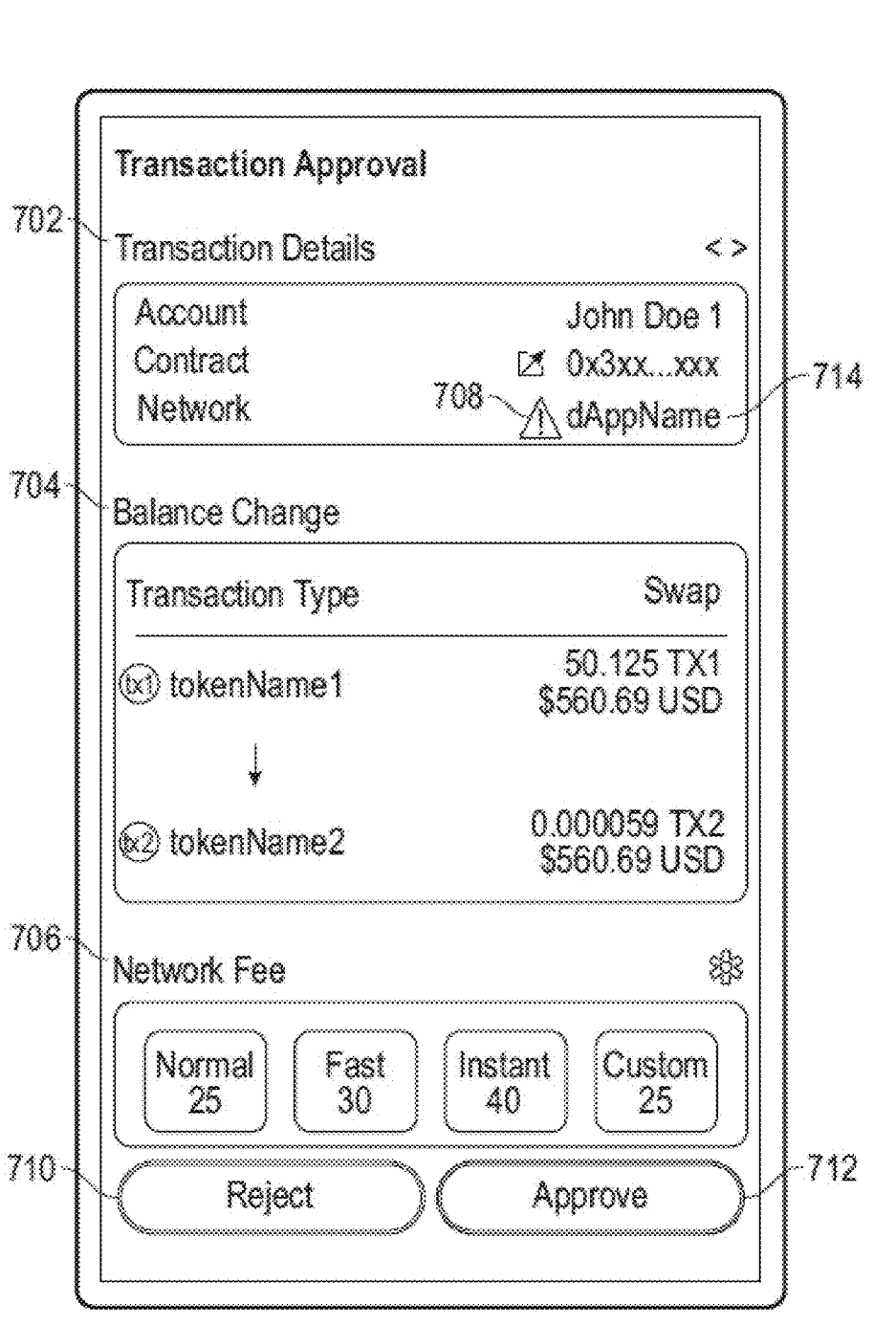
FIG. 7 illustrates exemplary display of a UI comprising an approval window/screen corresponding to a transaction request in a wallet, according to some embodiments.

FIG. 7 illustrates exemplary display of a UI 700 comprising an approval window/screen corresponding to a transaction request in a wallet, according to one or more embodiments. The approval windows may include, but is not limited to, an account (i.e., which account a user is sending a transaction from within the wallet), a desired contract or chain to interact with, a network corresponding to the desired contract or chain, or the like. The UI 700 of the approval window states which network the transaction is being signed on and details of the transaction (e.g., swap, pool, deposit, etc.). As shown in FIG. 7, the approval window includes transaction details 702 comprising at least the account, contract, and (target) network of a given transaction to be issued.

According to embodiments, an indication may be displayed on the approval window when the current network of the wallet is different from the target network that the transaction will be sent on. In some embodiments, a warning symbol 708 is displayed by the dAppName 714 operating on a target blockchain network. In the exemplary UI 700, the current network of the wallet is different from the target blockchain network desired for the transaction. The warning symbol 708 is provided to clearly indicate that to the user and helps ensure that the user is aware that they are signing a transaction on a different network. This does not interfere with the flow of processing the transaction.

A user of the wallet may specify balance change 704 information associated with the transaction. The balance change 704 may include a transaction type (e.g., swap) further comprising corresponding tokens and amounts. The example of FIG. 7 illustrates a user swapping "token-Name1" for "tokenName2." The balance change 704 may also include a conversion or equivalent value in a default token based on, for example, settings of the account. By non-limiting example, USD may be the default currency for the "John Doe 1" account. As such, a corresponding USD token value may be displayed along with the tokens being swapped in the given transaction.

The approval window may include the network fee 706 for executing the transaction. The user may select from a set of fee options that reflect different processing times/speeds (e.g., normal, fast, instant) or customize the amount. The user may submit the request (or similarly reject the request) by selecting a functional button (e.g., reject 710 or approve 712) on the approval window.

According to embodiments, elements used on the approval window may be implemented on a message signing window as well.

Hardware Overview

Figure 8:
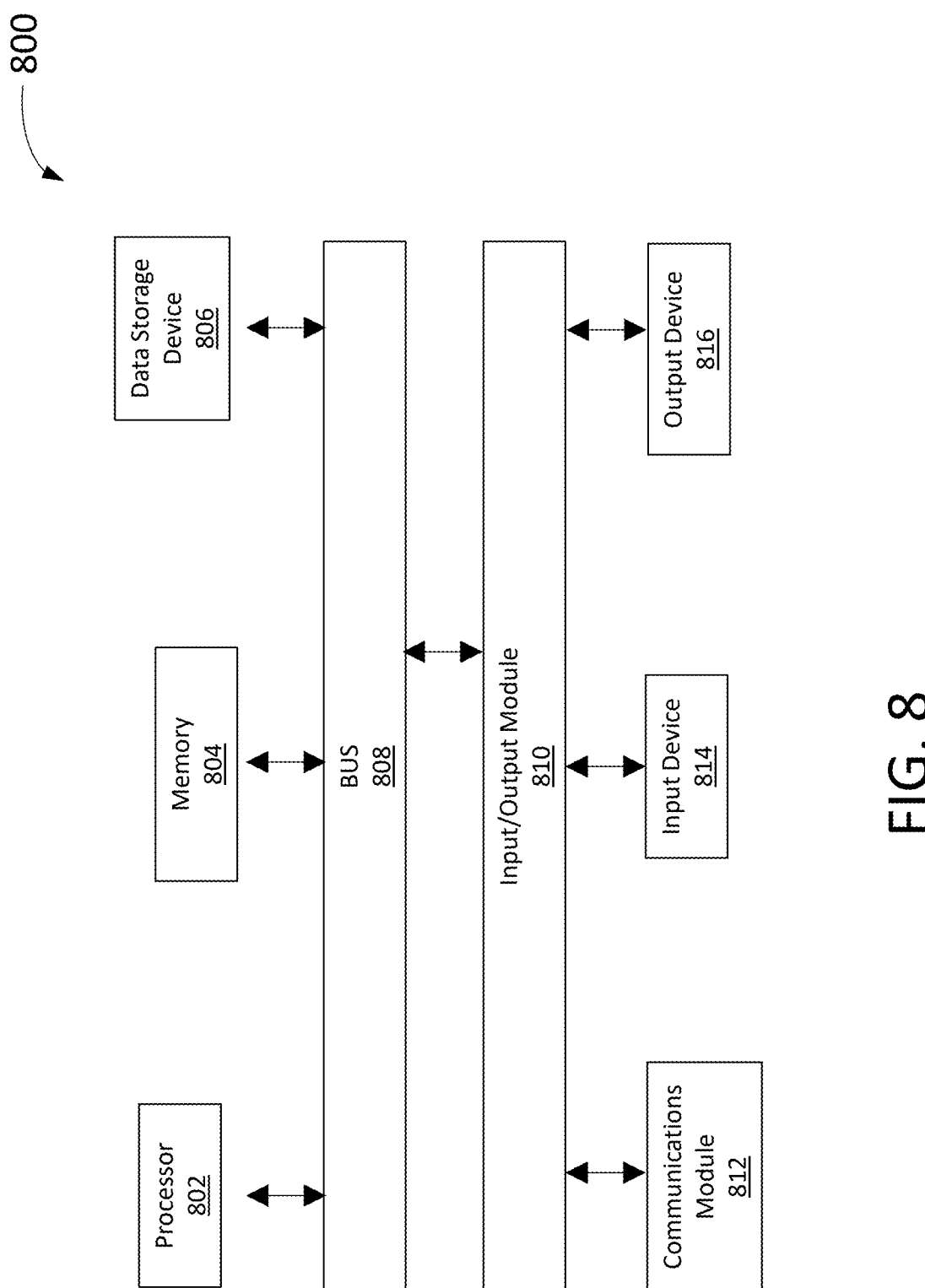
FIG. 8 is a block diagram illustrating a computer system used to at least partially carry out one or more of operations in methods disclosed herein, according to some embodiments.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, or integrated into another entity, or distributed across multiple entities. Computer system 800 may include a desktop computer, a laptop computer, a tablet, a phablet, a smartphone, a feature phone, a server computer, or otherwise. A server computer may be located remotely in a data center or be stored locally.

Computer system 800 includes a bus 808 or other communication mechanism for communicating information, and a processor 802 (e.g., processors 205) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220), such as a Random Access Memory (RAM), a Flash Memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 202) include networking interface cards, such as Ethernet cards and modems. In certain aspects, input/output module 810 is configured to connect to a plurality of devices, such as an input device 814 (e.g., input device 230) and/or an output device 816 (e.g., output device 232). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the participants 110/130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In some embodiments, the computer-readable media is non-transitory computer-readable media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for cross-chain signing in blockchain wallets, the method comprising:
   receiving, via a wallet connected to a first network, a transaction request for submitting a transaction on a decentralized application operating on a second network;
   determining that the first network is different from the second network;
   generating the transaction for the second blockchain network based on the transaction request and an identification parameter;
   signing, while maintaining an active connection to the first network, the transaction in the wallet for the second network using a private key of a user initiating the transaction request; and
   submitting the signed transaction to the second network, wherein the wallet remains connected to the first network.

2. The method of claim 1, further comprising determining whether the first network is different from the second network, wherein the identification parameter is attached to the transaction based on a determination that the first network is different from the second network.

3. The method of claim 1, further comprising:
   connecting the decentralized application to the wallet; and
   initiating, upon the decentralized application connecting to the wallet, the transaction on the second network using the decentralized application.

4. The method of claim 1, wherein the transaction request is a Remote Procedure Call (RPC).

5. The method of claim 1, further comprising transmitting the transaction including the identification parameter to the wallet, wherein the wallet parses the transaction request and identifies the second network based on the identification parameter attached to the transaction request.

6. The method of claim 1, further comprising displaying a transaction approval window on a user interface of the wallet, wherein the transaction approval includes a visual marker indicating that the first network is different from the second network.

7. The method of claim 1, further comprising determining, based on the transaction request, transaction information including at least in part a target chain on the second network, wherein the signed transaction is added to the target chain upon validation at the second network.

8. The method of claim 7, wherein the transaction information includes an account, a contract on the second network, the decentralized application, a transaction type, a balance of one or more tokens associated with the transaction, and a network fee.

9. The method of claim 1, further comprising prompting, at the wallet connected to the first network, the user to sign the transaction on the second network.

10. The method of claim 1, further comprising receiving a user selection for an approval or rejection of the transaction.

11. A system for cross-chain signing in blockchain wallets, the system comprising:
   one or more processors; and
   a memory storing instructions which, when executed by the one or more processors, cause the system to:
      receive, via a wallet connected to a first network, a transaction request for submitting a transaction on a decentralized application operating on a second network;
      determine that the first network is different from the second network;

generate the transaction for the second blockchain network based on the transaction request and an identification parameter;

sign, while maintaining an active connection to the first network, the transaction in the wallet for the second network using a private key of a user initiating the transaction request; and submit the signed transaction to the second network, wherein the wallet remains connected to the first network.

12. The system of claim 11, wherein the one or more processors further execute instructions to determine whether the first network is different from the second network, wherein the identification parameter is attached to the transaction based on a determination that the first network is different from the second network.

13. The system of claim 11, wherein the one or more processors further execute instructions to:

connect the wallet to the decentralized application; and accept, upon the wallet connecting to the decentralized application, the transaction request for the decentralized application.

14. The system of claim 11, wherein the transaction request is a Remote Procedure Call (RPC).

15. The system of claim 11, wherein the one or more processors further execute instructions to display a transaction approval window on a user interface of the wallet, wherein the transaction approval includes a visual marker indicating that the first network is different from the second network.

16. The system of claim 11, wherein the one or more processors further execute instructions to:

prompt, at the wallet connected to the first network, the user to sign the transaction on the second network; and receive, in response to the prompt, a user selection for an approval or rejection of the transaction.

17. A non-transitory computer-readable medium storing a program for cross-chain signing in blockchain wallets, which when executed by a computer, configures the computer to perform a method, the method comprising:

receiving, via a wallet connected to a first network, a transaction request for submitting a transaction on a decentralized application operating on a second network;

determining that the first network is different from the second network;

generating the transaction for the second blockchain network based on the transaction request and an identification parameter;

displaying a transaction approval window on a user interface of the wallet, wherein the transaction approval window includes a visual marker indicating that the first network is different from the second network;

signing, in response to a user selection on the transaction approval window, the transaction in the wallet on the second network while maintaining an active connection to the first network; and submitting the signed transaction to the second network, wherein the wallet remains connected to the first network.

18. The non-transitory computer-readable medium of claim 17, wherein the program, when executed by the computer, further configures the computer to perform:

connecting the wallet to the decentralized application; and accepting, upon the wallet connecting to the decentralized application, the transaction request for the decentralized application.

19. The non-transitory computer-readable medium of claim 17, wherein the program, when executed by the computer, further configures the computer to perform transmitting the transaction including the identification parameter to the wallet, wherein the wallet parses the transaction request and identifies the second network based on the identification parameter attached to the transaction request.

20. The non-transitory computer-readable medium of claim 17, wherein the program, when executed by the computer, further configures the computer to perform determining, based on the transaction request, transaction information including at least in part a target chain on the second network, wherein the signed transaction is added to the target chain upon validation at the second network.

\* \* \* \* \*